(12) United States Patent
Kakitsuba

(10) Patent No.: US 8,730,488 B2
(45) Date of Patent: May 20, 2014

(54) PRINT CONTROL APPARATUS, PRINT CONTROL SYSTEM, AND PRINTER DRIVER

(75) Inventor: Ryota Kakitsuba, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 120 days.

(21) Appl. No.: 13/071,896

(22) Filed: Mar. 25, 2011

(65) Prior Publication Data

US 2011/0286022 A1 Nov. 24, 2011

(30) Foreign Application Priority Data

May 19, 2010 (JP) ................. 2010-115809

(51) Int. Cl.
G06F 3/12 (2006.01)

(52) U.S. Cl.
USPC .............. 358/1.13; 399/24; 358/1.15

(58) Field of Classification Search
USPC ....................... 358/1.14, 1.15, 1.16
See application file for complete search history.

(56) References Cited

U.S. PATENT DOCUMENTS

| | | | |
|---|---|---|---|
| 8,345,277 B2 | 1/2013 | Emori | |
| 2005/0008376 A1* | 1/2005 | Parry et al. ............... | 399/24 |
| 2005/0200873 A1 | 9/2005 | Yamakawa et al. | |
| 2008/0068635 A1* | 3/2008 | Asano ..................... | 358/1.13 |
| 2008/0180699 A1 | 7/2008 | Selvaraj | |
| 2009/0213416 A1 | 8/2009 | Ishigure | |
| 2009/0225366 A1 | 9/2009 | Emori | |
| 2009/0251730 A1* | 10/2009 | Yamaguchi .............. | 358/1.15 |
| 2010/0007905 A1* | 1/2010 | Murashita ............... | 358/1.13 |
| 2010/0085591 A1* | 4/2010 | Arai ........................ | 358/1.13 |

FOREIGN PATENT DOCUMENTS

| | | |
|---|---|---|
| CN | 1908886 A | 2/2007 |
| CN | 101533339 A | 9/2009 |
| EP | 1 586 989 | 10/2005 |
| JP | 2005-267367 | 9/2005 |
| JP | 2005-267541 | 9/2005 |
| JP | 2006171920 A | 6/2006 |
| JP | 2007286700 A | 11/2007 |
| JP | 2008171096 A | 7/2008 |
| JP | 2008186465 A | 8/2008 |
| JP | 2009-199352 | 9/2009 |
| JP | 2009205512 A | 9/2009 |
| JP | 2009-301312 | 12/2009 |

OTHER PUBLICATIONS

Notification of Reasons for Refusal for Japanese patent application No. 2010-115809 mailed Mar. 13, 2012.
Extended European Search Report for European Application 11159861.1-1245 dated Jul. 17, 2012.

(Continued)

Primary Examiner — Houshang Safaipour
Assistant Examiner — Idowu O Osifade
(74) Attorney, Agent, or Firm — Banner & Witcoff, Ltd.

(57) ABSTRACT

A print control apparatus configured to control a plurality of types of printers, the print control apparatus including: a storage part storing a printer type, a function of the printer type, and a correspondence between the printer type and the function of the printer type; an acquisition part, which acquires identification information for identifying at least the printer type from the printer, and the acquisition part acquires the function corresponding to the printer type identified based on the identification information from the storage part, and a display part displaying an operation screen corresponding to the function acquired by the acquisition part.

10 Claims, 10 Drawing Sheets

(56) References Cited

OTHER PUBLICATIONS

Decision of Refusal issued in corresponding Japanese Application No. 2010-115809 dated Aug. 28, 2012.

Office Action issued in corresponding Chinese Patent Application No. 201110079840.8 dated May 6, 2013.

Notification of Second Office Action issued in corresponding China Application No. 201110079840.8 dated Nov. 20, 2013.

* cited by examiner

| ID NO. | MODEL NAME | COLOR SUPPORT | TWO-SIDED SUPPORT | AGGREGATION FUNCTION | OPTION SUPPORT | OPTION INFORMATION | FIRMWARE |
|---|---|---|---|---|---|---|---|
| 1 | MFP-x | YES | YES | YES | YES | — | 3.1.2 |
| 2 | MFP-y | NO | YES | YES | YES | — | 1.0.1 |
| 21 | MFP-y | NO | YES | YES | YES | TRAY 2 | 1.0.1 |
| 3 | MFP-z | NO | NO | NO | NO | — | 1.0.0 |
| 31 | MFP-z | NO | NO | YES | NO | — | 2.0.0 |

PRINT CONTROL APPARATUS, PRINT CONTROL SYSTEM, AND PRINTER DRIVER

CROSS-REFERENCE TO RELATED APPLICATION

This application claims priority from Japanese Patent Application No. 2010-115809 filed on May 19, 2010, the entire subject matter of which is incorporated herein by reference.

BACKGROUND

1. Technical Field

The present invention relates to a print control apparatus, a print control system, and a printer driver. Specifically, the present invention relates to a print control apparatus, a print control system, and a printer driver, which are able to control a plurality of types of printers having different functions respectively.

2. Background Art

The related art discloses a universal printer driver, which controls a plurality of types of printers having different functions respectively. For example, JP-A-2009-301312 discloses that when a printer does not support a function with respect to a selected print condition, a printer driver processes print data in response to the print condition.

SUMMARY

However, the related art printer driver mentioned above has the following problems. Since printers may have different functions depending to a printer type, when a common printer driver is used to control a plurality of types of the printers, a printer driver need to recognize a function supported by each printer to provide an suitable operation screen for the printer. Further, since recent printers have many functions a large amount of data is to be necessary for the functions of a printer. Therefore, a communication load increases if a request about the function from a printer is preformed whenever an operation screen is displayed.

The present invention is made with consideration of the above. Specifically, the present invention provides a print control apparatus, a print control system, and a printer driver, which can reduce the communication load and provide efficiently an operation screen suitable for each printer.

With consideration of the above, a print control apparatus in one exemplary aspect of the present invention configured to control a plurality of types of printers, the print control apparatus including: a storage part storing a printer type, a function of the printer type, and a correspondence between the printer type and the function of the printer type; an acquisition part, which acquires identification information for identifying at least the printer type from the printer, and the acquisition part acquires the function corresponding to the printer type identified based on the identification information from the storage part; and a display part displaying an operation screen corresponding to the function acquired by the acquisition part.

The print control apparatus of the present invention stores a printer type, function (for example, color printing, two-sided printing, resolution, and/or additional parts) of the printer type, and a correspondence between the printer type and the function of the printer type, in the storage part. When an operation screen is to be displayed, the identification information is acquired from the printer, and the function of the printer is identified based on that identification information and the information of the correspondence stored in the storage part. The identification information includes the information identifying at least the printer type. The information identifying the printer type is, for example, a model name of the printer, an ID number corresponding to the model name. The identification information may further include the information identifying each printer, such as a MAC address or an IP address, or the option information.

In other words, in the print control apparatus of the present invention, the printer type is identified based on the identification information acquired from each printer, and the function of each printer is identified by reading from the storage part the information corresponding to each of the printer types. Accordingly, when the operation screen is displayed, an operation screen corresponding to each printer can be provided without requesting a function specification of the function from each printer. A data size of the identification information is smaller than that of information identifying the function specification of the printer and has little influence on the communication load.

Additionally, in the print control apparatus of the other exemplary aspect of the present invention, when the correspondence between the printer type identified based on the identification information and the function of the printer type is not stored in the storage part, the acquisition part requests the function of the printer being a acquisition source of the identification information from the printer. That is, the function is requested from the printer only when it is not stored in the storage part that the printer type identified based on the identification information (for example, when the printer type identified based on the identification information is not stored, or when the function corresponding to the printer type is not stored even if the printer type is stored). According to this configuration, the aspect of the present invention can provide a suitable operation screen even when the information is not stored in the storage part.

Additionally, in the print control apparatus of the other exemplary aspect of the present invention, the storage part updates the correspondence between the printer type and the function of the printer type, based on the result of the request sent to the printer. According to this configuration, since the storage part is updated by the request results, it is not to be necessary to request from the printer many times, and the efficiency is improved. Further, when a new type of the printer is installed, this configuration can deal with the new type of the printer. Moreover, the amount of data in the storage part can be reduced at initial state, because the information is added to the storage part as necessary. For example, the storage part can be empty at the initial state and can be added with data when a new printer is found.

Additionally, in the print control apparatus of the other exemplary aspect of the present invention, the acquisition part acquires version information of firmware installed in the printer. By acquiring the version information (the information identifying whether firmware is older or newer), different types of printers for each versions of firmware can be managed.

Additionally, in the print control apparatus of the other exemplary aspect of the present invention, when the version information acquired from the printer is newer than the version information stored in the storage part, the acquisition part requests the function of the printer type from the printer and displays an operation screen corresponding to the result of the request. According to this configuration, if the firmware of the printer has a newer version, the functional configuration by that firmware may be reflected on the operation screen.

Additionally, in the print control apparatus of the other exemplary aspect of the present invention, when the version information acquired from the printer is older than the version information stored in the storage part, an update instruction is outputted to notify updating of the firmware installed in the printer or to update the firmware to the printer. If the printer having an older firmware version is detected, it is preferable to update it with a newer firmware version.

Additionally, in the print control apparatus of the other exemplary aspect of the present invention, when it is impossible to acquire the printer type, the acquisition part receives an inputting of information and identifies the printer type based on the inputted information. It makes preferable a user input the printer type if the printer type cannot be acquired. In the input of the alternative information, a printer name may be inputted or selected from the list of the printer names registered in the storage part.

Additionally, in the print control apparatus of the other exemplary aspect of the present invention, the acquisition part acquires function addition information for identifying whether an addition of other functions to the printer is possible, and wherein, when the addition of other functions to the printer is possible, the acquisition part requests the presence of an additional function. According to this configuration, an operation screen corresponding to additional parts (optional functions) may be provided. The additional parts are, for example, an additional tray or an additional memory.

Further, as one alternative aspect, a print control system of the present invention configured to control a plurality of types of printers, the print control apparatus including: a storage part storing a printer type, a function of the printer type, and a correspondence between the printer type and the function of the printer type; an acquisition part, which acquires identification information for identifying at least the printer type from the printer, and the acquisition part acquires the function corresponding to the printer type identified based on the identification information from the storage part, and a display part displaying an operation screen corresponding to the function acquired by the acquisition part.

Further, as one alternative aspect, a non-transitory computer-readable medium having a printer driver that operate a print control apparatus configured to control a plurality of types of printers, the printer driver causes the a print control apparatus to perform operations including: storing a printer type, a function of the printer type, and a correspondence between the printer type and the function of the printer type; acquiring identification information for identifying at least the printer type from the printer and acquiring the function corresponding to the printer type identified based on the identification information from the storage part, and displaying an operation screen corresponding to the function acquired by the acquisition part.

The present invention achieves the print control apparatus, the print control system, and the printer driver, which can reduces communication load and efficiently provide an operation screen suitable for each printer.

DESCRIPTION OF PREFERRED ILLUSTRATIVE ASPECTS

Hereinafter, an illustrative aspect of a print control apparatus according to the present invention is described in detail with reference to the accompanying drawings. In the illustrative aspect, the present invention is applied to a personal computer (PC) outputting a printing instruction to a printer and to a print control system having a plurality of printers.

[The General Configuration of the Print Control System]

Figure 1:
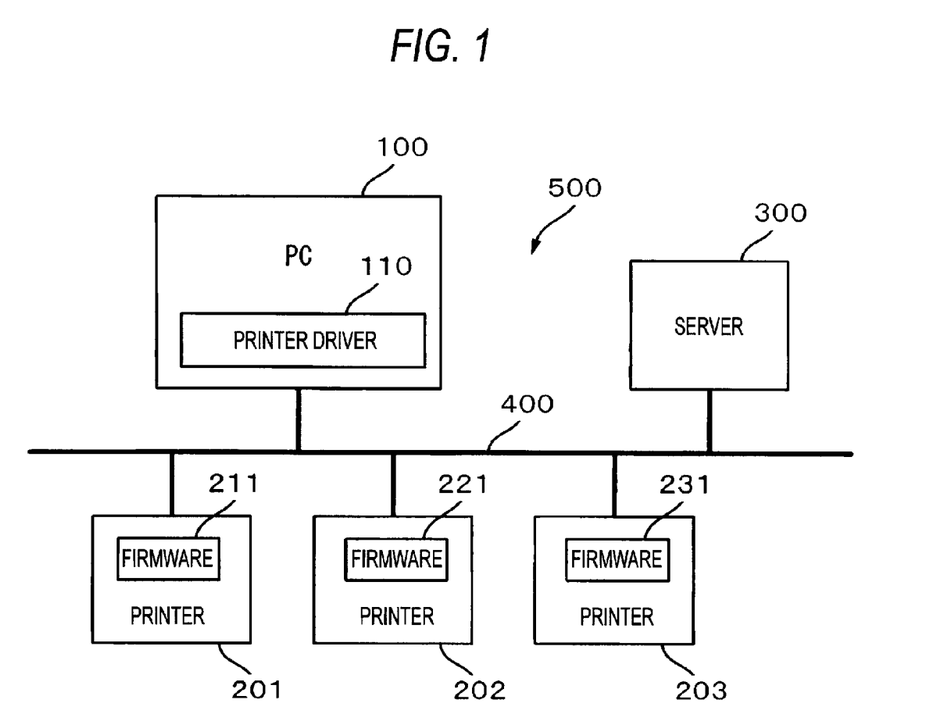
FIG. 1 is a block diagram illustrating the configuration of the print control system according to the illustrative aspect.

As illustrated in FIG. 1, a print control system 500 has a PC 100 (an example of a print control apparatus) outputting print data to a designated printer, printers 201, 202, and 203 having a printing function, and a server 300 managing the whole print control system 500. Further, in the print control system 500, the PC 100, the printers 201, 202, and 203, and the server 300 are connected to a network 400. The printers 201, 202, and 203 are not necessary to be the same model (type) and may be different types.

A universal printer driver (hereinafter, "the printer driver 110") is installed in the PC 100, and the printer driver 110 can control several types of printers. In this illustrative aspect, the printers 201, 202, and 203 is operable by the printer driver 110, and the printer driver 110 is used to output a printing job from the PC 100 to the printers 201, 202, and 203.

Figure 2:
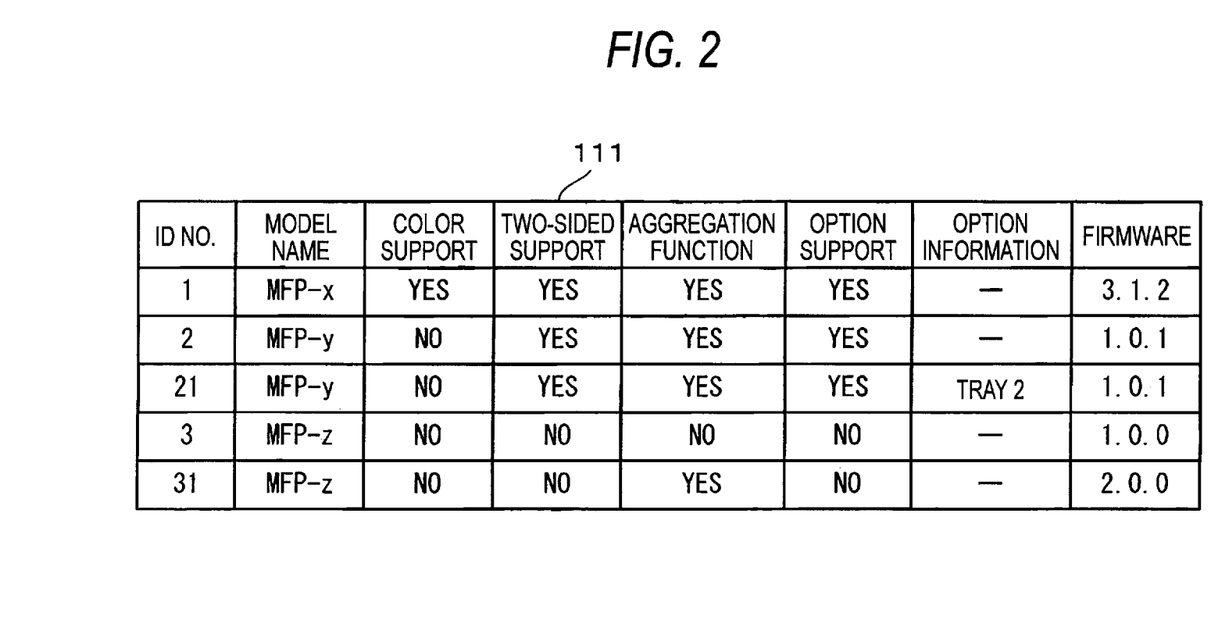
FIG. 2 is a view illustrating an example of a database storing printer types and functions of the printer types.

The printer driver 110 has a database (an example of a storage part; hereinafter, referred to as a DB 111) storing several types of information about controllable printers, as shown in FIG. 2. Specifically, models names (names of types) of printers, functions available in that models, and firmware versions are corresponded with each other and stored as one record in the DB 111. The item "Option support" in the DB 111 indicates whether an additional part (for example, an additional tray or an additional memory; hereinafter, an "optional part") can be mounted.

When the same model may have different available functions in response to optional parts, the DB 111 is provided with a record based on each contents of that optional parts. For example, the model name "MFP-y" in FIG. 2 has a record (ID No. 2 in FIG. 2) of a condition in which an optional part is not mounted, and another record (ID No. 21 in FIG. 2) of a condition in which an optional part is mounted. Whether an optional part is mounted may be determined by the presence of data in the item "Option Information" of the DB 111.

Even in the same model, available functions may be different based on the different firmware versions of the printer. Thus, the DB 111 is provided with different records for each different firmware versions. For example, the model "MFP-z" of FIG. 2 has different records for different firmware versions (ID Numbers 3 and 31 in FIG. 2).

Firmware 211 is installed in the printer 201 to control an image forming unit or a display part, etc. Firmware 221 and 231 is respectively installed in printers 202 and 203, each of the firmware corresponding to each type. Each of the printers 201, 202 and 203 has a response function, which notifies own identification information in response to a demand of the printer driver 110. The identification information includes information identifying the printer type. The identification information identifying the printer type may include, for example, a model name or an identification code corresponding to the model name. In addition, the identification information is also added information specifying each printer, such as an IP address or a MAC address. In the following description, a model name and an IP address are included as the identification information.

Meanwhile, a printer may be connected with several PCs, and several printers are connected with a PC, in the print control system 500. Moreover, other information processing units or image processing units may be connected with the print control system 500.

[The Configuration of the PC]

Figure 3:
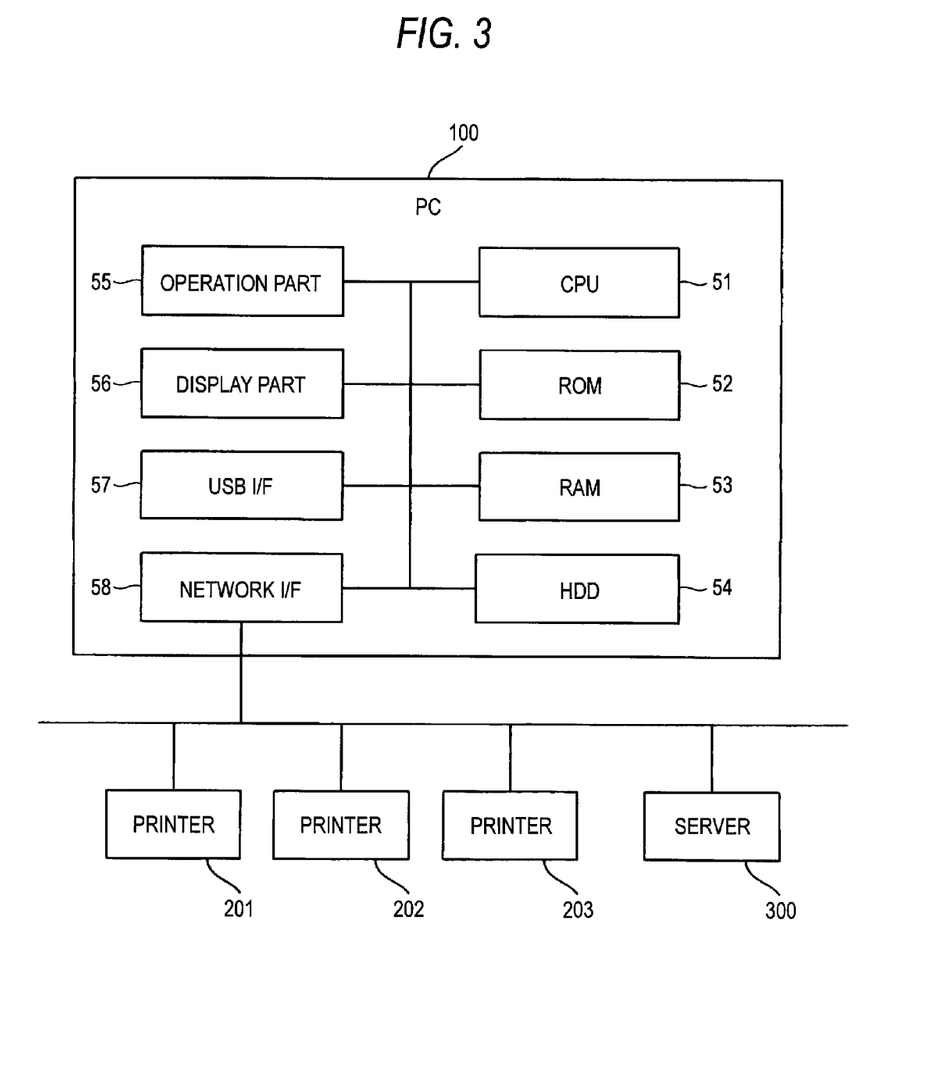
FIG. 3 is a block diagram illustrating the electronic configuration of the printer included in the print system.

The general configuration of the PC 100 will be described below. As illustrated in FIG. 3, the PC 100 includes a CPU 51, a ROM 52, a HDD 54, an operation part 55 having a keyboard or a mouse, etc., a display part 56 having a liquid crystal display, etc., a USB interface 57, and a network interface 58.

The HDD 54 of the PC 100 is installed an operating system (OS), a device driver controlling several devices, or an application program (such as a word processor or a table calculation software) having the function of a print instruction. The printer driver 110 mentioned above is also installed in the HDD 54.

The CPU 51 performs several processes, based on a control program read from the ROM 52 or an application program read from the HDD 54, while storing the calculation results in the RAM 53 or the HDD 54. The operation of the printer driver 110 is processed by the CPU 51.

[The Display Operation of a User Interface of the Printer Driver]

The display operation of a user interface by the printer driver 110 will be described below. The printer driver 110 has a user interface to set up an operation of each printer.

Figure 4:
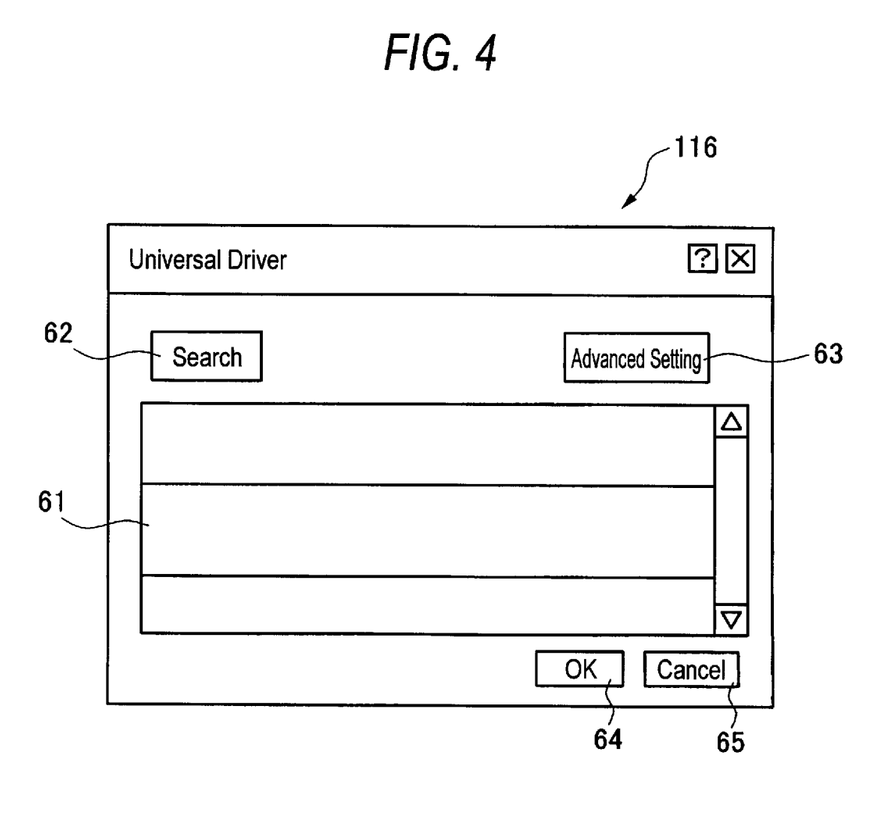
FIG. 4 is a view illustrating an example of displaying the printer selecting screen (before the search)

When receiving a display instruction of the user interface, the printer driver 110 of the illustrative aspect displays a printer selecting screen 116 (an example of an operation screen) as shown in FIG. 4. The printer selecting screen 116 displays a list box 61 displaying the list of printers, a search button 62, an advanced setting button 63, an OK button 64, and a cancel button 65, etc. Nothing is shown in the list box 61 at the initial state right after the printer selecting screen 116 is displayed.

Figure 5:
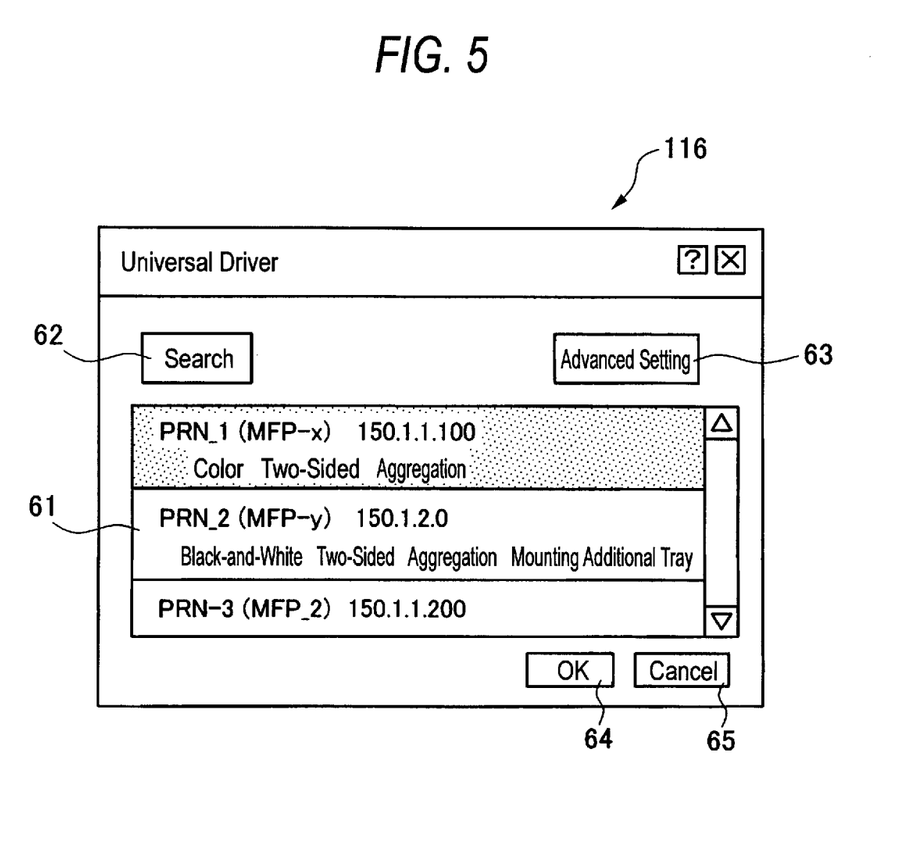
FIG. 5 is a view illustrating an example of displaying the printer selecting screen (after the search)

When the search button 62 in the printer selecting screen 116 is pressed, the printer driver 110 begins to search for printers to which the PC 100 can connect. Then, the printer driver 110 displays searched printers in the list box 61 as a list. FIG. 5 illustrates the state of the printer selecting screen 116 after searching for the printer. The list box 61 displays the information of each printer, such as an IP address (or a printer name for each printer), a model name of the printer, the availability of color printing, the availability of double-sided printing, the presence of an aggregation function, and the presence of an option part. When a printer that has no identified model name is found, the list box 61 displays a notice that the model name of the printer is not identified.

Figure 6:
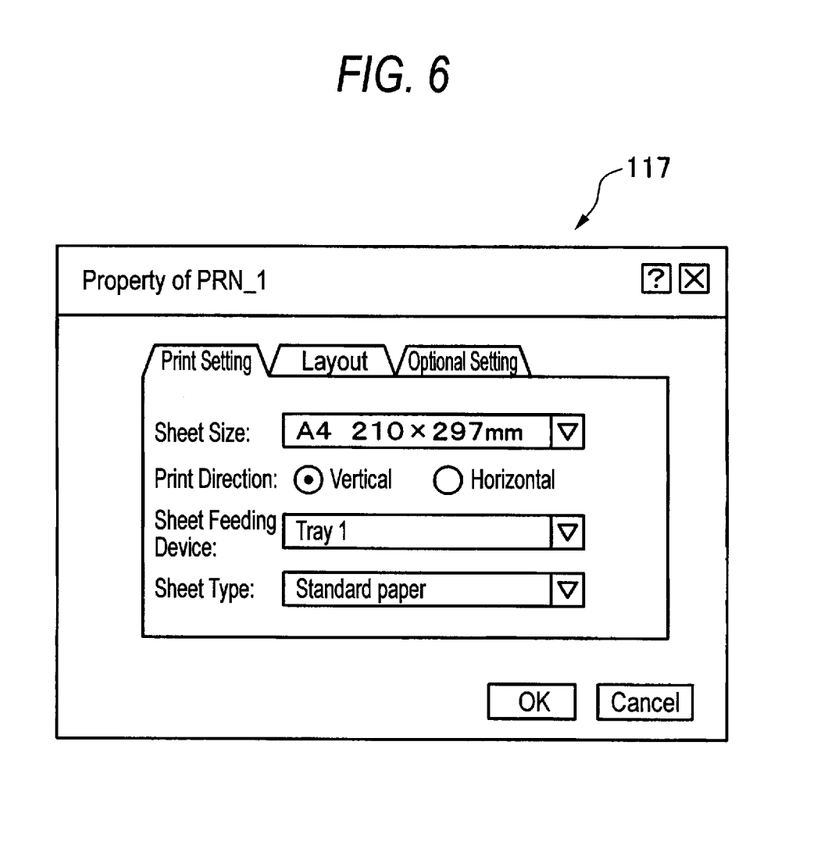
FIG. 6 is a view illustrating an example of displaying the print setting screen.

If the advanced setting button 63 is pressed when one printer is selected in the list box 61, the printer driver 110 displays a print setting screen for that selected printer. FIG. 6 shows a view illustrating an example of a print setting screen 117 for the printer when the advanced setting button 63 is pressed in the state of FIG. 5 (the state that the first printer in the list box 61 is selected). In this print setting screen 117, several settings for printing (e.g., a sheet size, a printing orientation, a sheet feeding apparatus, a sheet type, a layout, or a sheet decoration) is received. Furthermore, the print setting screen 117 has a screen layout common to a plurality model of printers. However, a function, which is not supported by respective printer models, is restricted by gray-out displaying or hidden.

[Search Process]

The search process (an example of an acquisition part and a display part) by the printer driver 110 will be described below with reference to the flowchart of FIG. 7. The search process is executed by pressing the search button 62 of the printer selecting screen 116.

First, the PC 100 requests about the identification information from the printers, to which the PC 100 is connectable (step S101). In other words, a transmit instruction to transmit the identification information is broadcasted to several unspecified printers in the network 400. The printers that receive the instruction to transmit the identification information output its identification information to the PC 100. The identification information includes the model name and the IP address, as described above. However, this identification information does not include the function information of the printer (e.g., color printing, two-sided printing, or resolution).

Then, one item is extracted from the received information (step S102). It is determined whether the received information includes the information (the model name in this aspect) identifying the type of the printer (step S103). For example, if the printer is so old model as to have no function of responding with that model name, the information stating the model name being unidentified is acquired.

If the received information does not include the information identifying the printer type, that is, if the model name is unidentified (step S103: YES), the list box 61 displays that a printer having the unidentified model name is found out (step S111). After that, the process proceeds to step S109.

In contrast, if the received information includes the information identifying the printer type, that is, if the model name is identifiable (step S103: NO), it is determined whether the identified model name is registered in the DB 111 (step S104). For example, right after the new printer is connected in the network 400, the information of a new printer is not registered in the DB 111. Therefore, the model name of the new printer may be acquired, but it is in an unregistered state.

If a model name has already been registered (step S104: NO), the function information of the printer corresponding to that model name is acquired with reference to the DB 111 (step S105). In other words, the record corresponding to the identified model name is extracted from the DB 111. The printer driver 110 holds the information, in which IP addresses specifying each of printers and ID numbers of the record in the RAM 53 is corresponded, as apparatus information. Meanwhile, if there are plural records for the same model name, it is extracted, as temporary apparatus information, a record of the configuration in which an option part is not mounted and the firmware version is the latest. Processing of identifying records is performed in step S106 and step S107 as described below.

Figure 8:
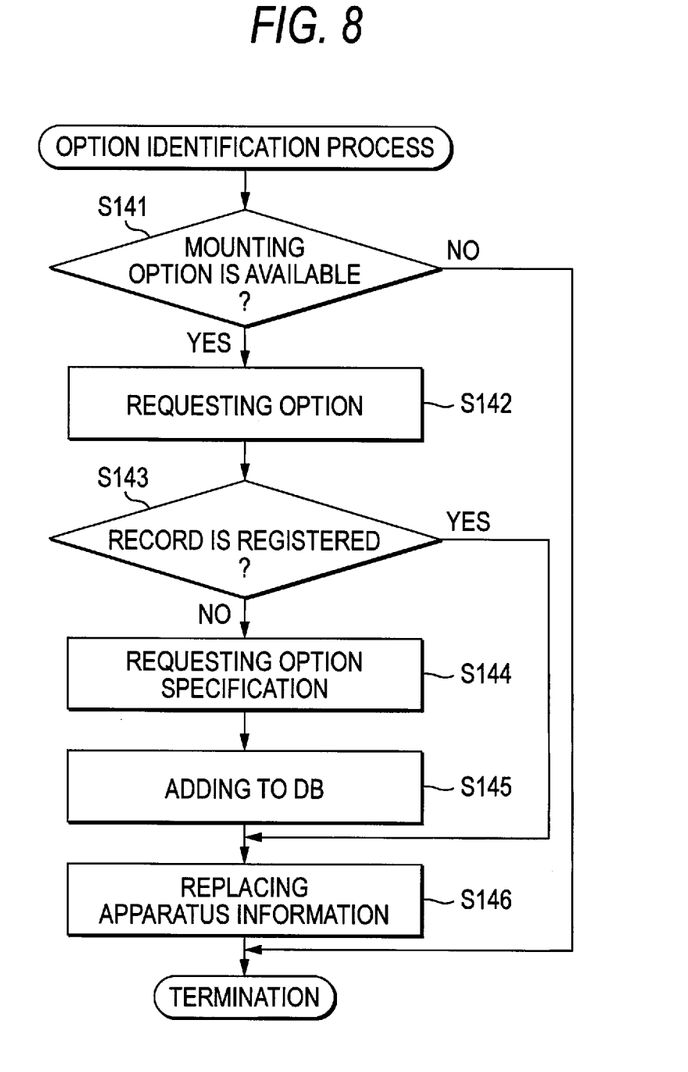
FIG. 8 is a flowchart illustrating the sequence of the option identification process.

Then, an option identifying process is performed to identify a mounted state of an option part (step S106). That is, the DB 111 has different records for different states of mounting an option part. Thus, it is determined in step S106 which record corresponds to that option part. FIG. 8 illustrates the sequence of the option identifying process of step S106.

First, it is determined whether the model can mount an option part. In other words, it is determined whether the option support item of the function information acquired in step S105 is "YES" or not (step S141). If the model cannot mount the option part (step S141: NO), because it is determined there is no other record depending on the different option part, the option identification process is terminated.

If the model can mount an option part (step S141: YES), it is requested which option part has been mounted from the specified printer of the identification information (step S142). In response to that request, the printer responds with a type of the mounted option part. Then, based on the result of the response from the printer, it is determined whether the mounted option part is identical to the option part registered in the DB 111 (step S143). If it is the option part registered in the DB 111 (step S143: YES), the ID number stored in the apparatus information is replaced with the ID number of the record corresponding to the state of that option part mounted (step S146), and then the option identification process is terminated. If the option part is not mounted, the option identification process is terminated without changing the apparatus information. If a plurality of records is extracted with different versions, the newest record is extracted among them.

Meanwhile, the option part is not registered in the DB 111 (step S143: NO), the detailed information about the option part is requested from the printer (step S144). The printer responds to the request about the detailed information of the option part. Then, that option part is newly registered in the DB 111 as a model to which the new option is added (step S145). After that, the ID number stored in the apparatus information is replaced with the ID number of the new record (step S146), and the option identification process is terminated.

Figure 7:
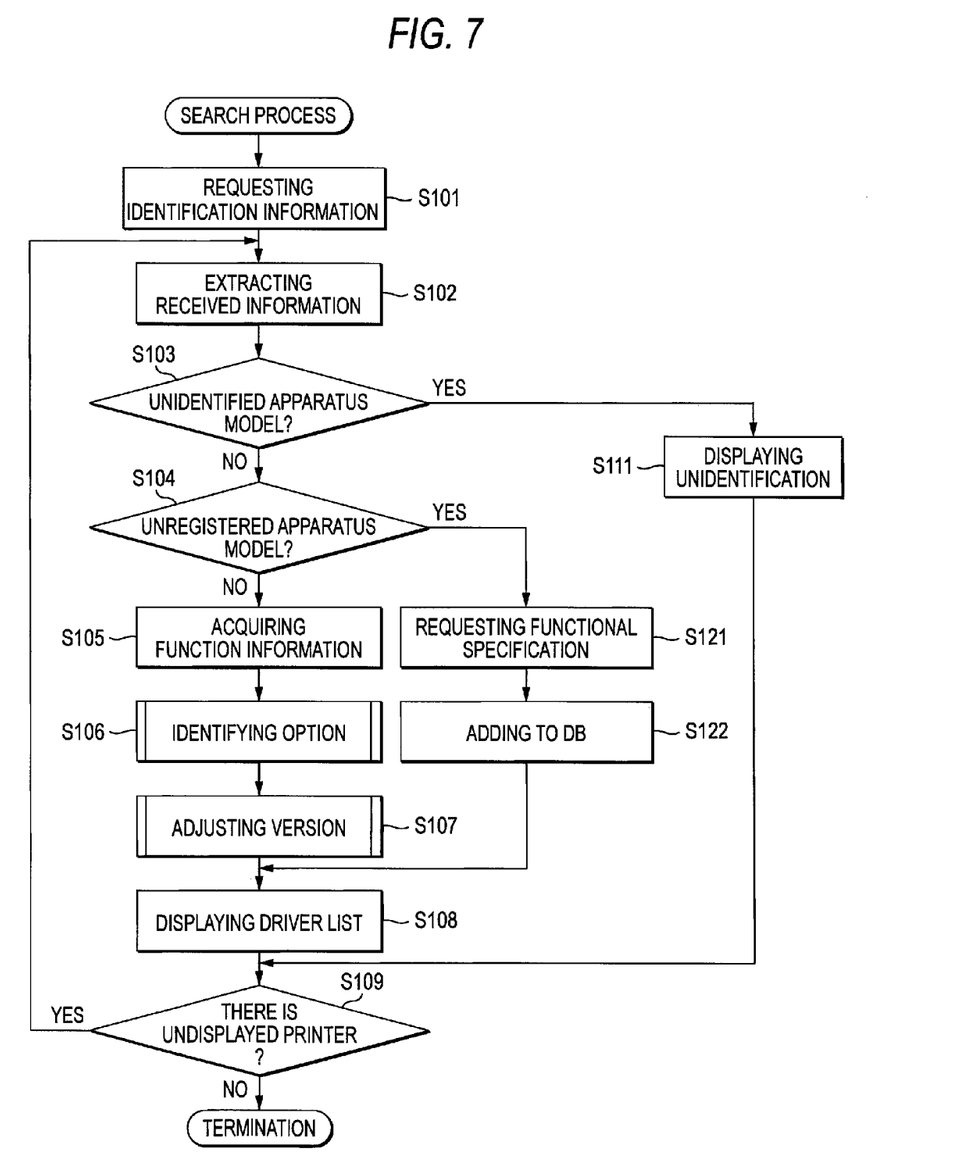
FIG. 7 is a flowchart illustrating the sequence of the search process of the universal printer driver according to the illustrative aspect.
Figure 9:
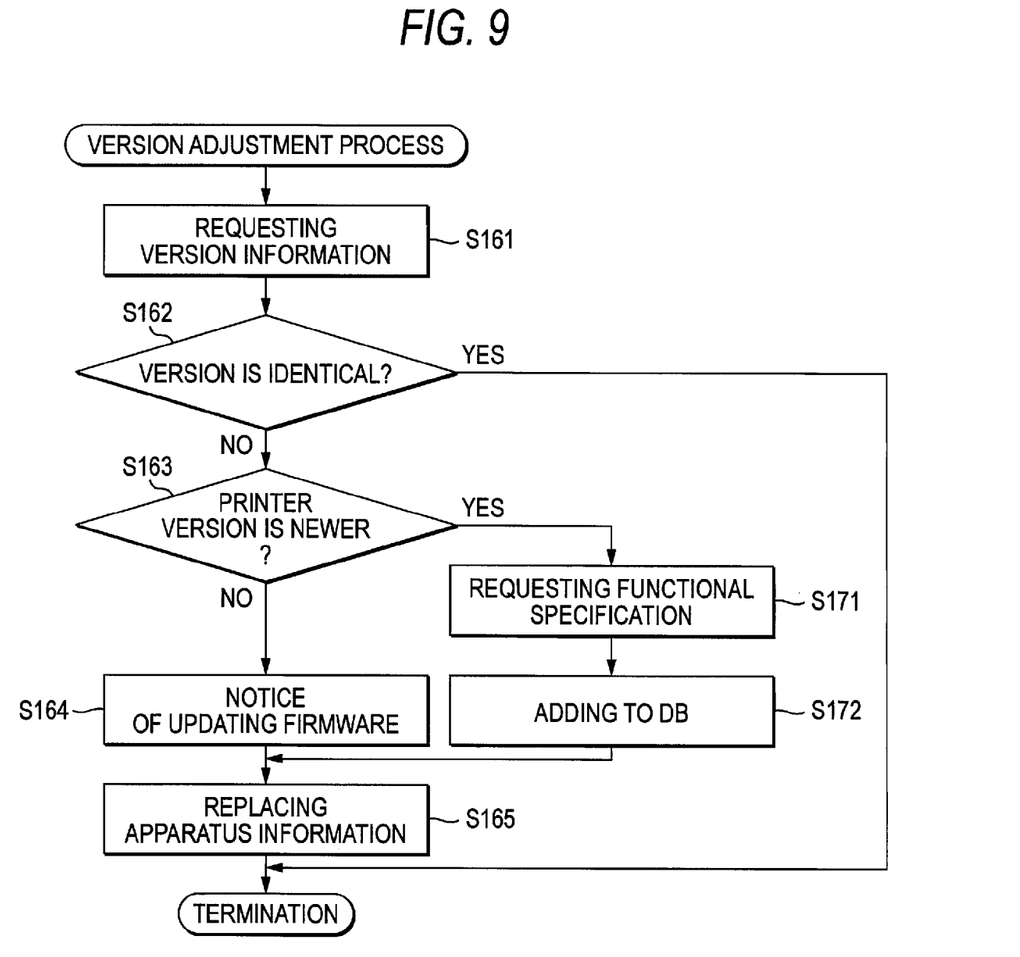
FIG. 9 is a flowchart illustrating the sequence of the version adjustment process.

In FIG. 7, after the process of step S106, a version adjustment process is performed to adjust a firmware version of the printer (step S107). Because the DB 111 has different records for different versions of firmware, it is determined which record is to be corresponded to the version. FIG. 9 illustrates the sequence of the version adjustment process of step S107.

First, a version of firmware is requested from the specified printer of the identification information is to be determined (step S161). Accordingly, the version of firmware installed in the printer is acquired.

Then, the version acquired from the printer in step S161 is compared with the latest version stored in the DB 111 of the printer driver 110, and it is determined whether the two versions are identical (step S162). If the versions are the same (step S162: YES), the change in the apparatus information is not required, and thus the version adjustment process is terminated.

In contrast, if the two versions are different (step S162: NO), it is determined whether the version acquired from the printer is newer than the version acquired from the printer driver (step S163). If the version acquired from the printer is newer (step S163: YES), every function information required by the printer driver is acquired to the printer (step S171). Thereafter, the function information acquired from the printer is registered in the DB 111 as a new record with the version information (step S172). That is, even when the printers have the same model names, if they have different version information, the printers are identified as different models when. After that, the ID number stored in the apparatus information is replaced with the ID number of the new record (step S165), and the version adjustment process is terminated.

Meanwhile, if the version acquired from the printer is older (step S163: NO), a notice is informed that updating of the firmware of the printer (step S164). As a way of the notice, for example, an update instruction is transmitted to the printer, and the firmware is automatically updated in the printer. Otherwise, the display part 56 of the PC may display a message informing that the firmware update of the printer is necessary. Then, the ID number stored in the apparatus information is replaced with the ID number of the record corresponding to the firmware version of the printer (step S165), and the version adjustment process is terminated. Meanwhile, if there is no record corresponding to the version in the DB 111, the function information is requested from the printer, and a new record is made, thereafter the ID number of the apparatus information is replaced with the ID number of that new record.

In FIG. 7, after the process of step S107, the contents stored in the apparatus information is displayed in the list box 61. That is, the function information corresponding to IP addresses and ID numbers is displayed in a lump.

Meanwhile, if the model name of a printer is unregistered in step S104 (step S104: YES), every function information required by the printer driver 110 is requested from that printer (step S121). Then, the function information acquired from the printer is registered with corresponding to the model name in the DB 111 (step S122). Further, the printer driver 110 holds the information, in which the IP address and the ID number of the added record is corresponded, in the RAM 52 as the apparatus information. Then, the contents stored in that apparatus information is displayed in the list box 61 (step S108). Accordingly, although an unregistered model name is detected, the function of that model can be displayed by exceptional requesting the function from the printer. In a next search, the request about the function information is not necessary because the model name is registered in the DB 111.

After step S108 or step S111, it is determined whether there is a non-displayed printer in the list box 61 among the printers that have responded with the identification information (step S109). If there is a non-displayed printer (step S109: YES), the process returns to step S102, and the identification information of that printer is extracted and displayed in the list box 61. If there is not the non-displayed printer (step S109: NO), the search process is terminated, since the searched printers are all displayed in the list box 61.

In this search process, the functions of printers other than unregistered models are acquired from the DB 111 and are not requested from those printers themselves. Therefore, the communication load of the search process is lower than that of a process in which the function of each printer is requested from the printer every time being searched. Meanwhile, with respect to unregistered models, the request of a function is performed at one time, and the result is stored in the DB 111. Accordingly, the function of the printer can be acquired from the DB 111 at the next searches. Therefore, the number of the request sent to printers about their functions is to be reduced.

[The Unidentified Process]

Figure 10:
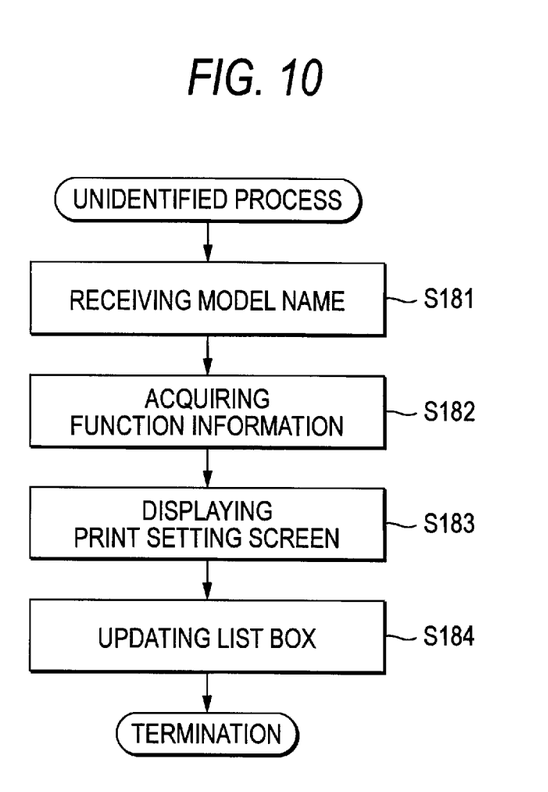
FIG. 10 is a flowchart illustrating the sequence of the unidentified process.

With respect to a printer whose model name is unidentified in step S111, the process on the unidentified printer (herein after also referred to as unidentified process), the process relating to the print setting screen 117, will be described below with reference to the flowchart of FIG. 10. This unidentified process is performed by pressing the advanced setting button 63 when the printer is displayed in the list box 63 as an unidentified model name.

First, an input screen is displayed to receive an input of a model name (step S181). In this input screen, a model name may be directly inputted, or one of the model names registered in the DB 111 may be selected from the list. A number corresponding to the model name may also be inputted or selected. That is, any method of inputting the information to identify the model name by a user may be used in step S181.

Then, based on the input information in step S181, the function information of a printer is acquired with reference to the DB 111 (step S182). After that, based on that function information, the print setting screen 117 is displayed (step S183). Furthermore, based on that function information, the contents in the list box 61 of the printer selecting screen 116 is updated (step S184). Accordingly, the problem on the unidentified of the model name is resolved.

As described above in detail, the printer driver 110 of the illustrative aspect acquires the identification information that may identify the printer types from each of those printers and reads the function corresponding to the printer type from the DB 111 based on the identification information. Therefore, a function provided to each printer is identified. As a result, when the list box 61 of the printer selecting screen 116 is displayed, a screen corresponding to each printer can be provided without requesting from each printer the specification of its function.

In the illustrative aspect, although the identification information for identifying the printer type is acquired from the printer (step S101) whenever a search operation is performed, that identification information acquired in step S101 has a smaller size than the information for identifying the function of the printer (for example, the information obtained in step S121). Thus, the search operation has low influence on the communication.

The illustrative aspect describes only as one example and does not limit the present invention. Therefore, the present invention may be improved and modified in several manners within the present invention. For example, the printer may be any apparatus having the function of printing and may be applied to a multi-function device or a copier. Moreover, the print control apparatus is not limited to a PC, and may be a mobile information device or a workstation.

In the illustrative aspect, the database 111 storing the printer types and the functions of the printers belongs to the printer driver 110 (herein the PC 100 itself), but the present invention is not limited to this configuration. For example, the database may be stored in the server 300, or a USB memory directly connected to the PC 100.

In the illustrative aspect, the printer is connected to the network 400, but the present invention is not limited to this configuration. For example, the connection may be a USB connection or a parallel port connection.

In the illustrative aspect, although a plurality of printers are connected to the PC 100 via the network 400, the PC 100 only have to be able to control several types of printers, and the PC 100 does not necessarily control the plurality of printers. In other words, the present invention may be applied to the situation where there is only one printer to be controlled.

In the illustrative aspect, if it is impossible to specify the model name of a printer, a notice being unidentified is displayed in the list box 61, but the present invention is not limited to this configuration. For example, when a printer whose model name may not be identified is found in the search process, the printer may make a user input information identifying the model name of that printer in step S111. Moreover, if it is impossible to identify the model name of a printer, that a printer may be not displayed in the list.

In the search process in the illustrative aspect, the condition of the option is requested from a printer upon the option identification process. However, the condition of the option does not have to be requested again from the printer if the identification information acquired in step S101 includes information relating the option.

In the search process in the illustrative aspect, a version is requested from a printer in the version adjustment process. However, the version does not have to be requested again from the printer if the identification information acquired in step S101 includes information relating the version.

In the illustrative aspect, although the apparatus information is acquired whenever the search process is performed, the apparatus information may be stored in other databases. In other words, the apparatus information may be managed in a nonvolatile memory such as the HDD 54, in which the information is not eliminated even when the power of the PC 100 is off. Then, in searching for a printer, after the identification information is requested, it refers the database of the apparatus information. If a record of the IP address is identical to the printer, the ID number of the DB 111a may be specified based on the IP address of the printer. And, the function may be requested from only printers that have IP addresses which are not stored in the database of the apparatus information. According to this configuration, the search results is acquired earlier, and the number of the requests their functions from printers is reduced. Meanwhile, as in the illustrative aspect, the configuration in which the apparatus information is made whenever the search button 62 is pressed, the function information suitable for the current printer is acquired although an apparatus is changed with having the same IP address or the firmware of a printer is updated after the previous search. Thus, an appropriate operation screen is more probably displayed.

What is claimed is:

1. A print control apparatus configured to control a plurality of models of printers, the print control apparatus comprising:
  a storage device configured to store a printer model name, function information corresponding to the printer model name and hardware component information for the printer model name, the hardware component information indicating whether an optional hardware component is mounted to the printer;
  a display device; and a controller configured to:
  search a printer capable of communication via a network;
  acquire the printer model name from the printer while searching the printer;
  determine whether the acquired printer model name has already been stored in the storage device prior to acquiring the printer model name from the printer;
  determine whether the optional hardware component can be mounted to the printer based on the acquired printer model name;
  acquire the function information corresponding to the acquired printer model name from data stored, prior to the searching of the printer, in the storage device without acquiring either the function information or the hardware component information from the printer in response to determining that the acquired printer model name has already been stored in the storage device, and that the optional hardware component cannot be mounted to the printer;
  acquire, from the printer, the hardware component information for the acquired printer model name without acquiring, from the printer, the function information corresponding to the acquired printer model name, in response to determining that the acquired printer model name has already been stored in the storage device, and that the optional hardware component can be mounted to the printer;
  acquire, from the printer, both the function information and the hardware component information corresponding to the acquired printer model name when the acquired printer model name has been determined to not already be stored in the storage device; and generate an operation screen using one of the acquired function information stored in the storage device and the acquired function information acquired from the printer.

2. The print control apparatus according to claim 1, wherein the storage device is configured to update a database including the function information corresponding to the printer model name, based on the result of the searching of the printer.

3. The print control apparatus according to claim 1, wherein the controller is configured to acquire version information of firmware installed in the printer.

4. The print control apparatus according to claim 3, wherein, when the version information acquired from the printer is newer than version information stored in the storage device, the controller is configured to request the function information of the printer model name from the printer and to display an operation screen corresponding to the result of the request.

5. The print control apparatus according to claim 3, wherein, when the version information acquired from the printer is older than version information stored in the storage device, an update instruction is outputted to notify of updating of the firmware installed in the printer or to update the firmware to the printer.

6. The print control apparatus according to claim 1, wherein, when it is impossible to acquire the printer model name, the controller is configured to receive an inputting of information and to identify the printer model name based on the inputted information.

7. The print control apparatus according to claim 1, wherein the controller is configured to acquire function addition information for identifying whether an addition of other functions to the printer is possible, and wherein, when the addition of other functions to the printer is possible, the controller is configured to request the presence of an additional function.

8. A print control system configured to control a plurality of models of printers, the print control system comprising:

a storage device configured to store a printer model name, function information corresponding to the printer model name and hardware component information for the printer model name, the hardware component information indicating whether an optional hardware component is mounted to the printer;

a display device; and a controller configured to:

search a printer capable of communication via a network;

acquire the printer model name from the printer while searching the printer;

determine whether the acquired printer model name has already been stored in the storage device prior to acquiring the printer model name from the printer;

determine whether the optional hardware component can be mounted to the printer based on the acquired printer model name;

acquire the function information corresponding to the acquired printer model name from data stored, prior to the searching of the printer, in the storage device without acquiring either the function information or the hardware component information from the printer in response to determining that the acquired printer model name has already been stored in the storage device, and that the optional hardware component cannot be mounted to the printer;

acquire, from the printer, the hardware component information for the acquired printer model name without acquiring, from the printer, the function information corresponding to the acquired printer model name, in response to determining that the acquired printer model name has already been stored in the storage device, and that the optional hardware component can be mounted to the printer;

acquire, from the printer, both the function information and the hardware component information corresponding to the acquired printer model name when the acquired printer model name has been determined to not already be stored in the storage device; and generate an operation screen using one of the acquired function information stored in the storage device and the acquired function information acquired from the printer.

9. A non-transitory computer-readable medium having a printer driver for operating a print control apparatus configured to control a plurality of models of printers, the printer driver, when executed, causing the print control apparatus to perform operations comprising:

searching a printer capable of communication via a network;

acquiring a printer model name from the printer while searching the printer;

determining whether the acquired printer model name has already been stored in the storage device prior to acquiring the printer model name from the printer;

determining whether an optional hardware component can be mounted to the printer based on hardware component information corresponding to the printer model name, the hardware component information indicating whether the optional hardware component is mounted to the printer;

acquiring function information corresponding to the acquired printer model name from data stored, prior to the searching of the printer, in the storage device without acquiring either the function information or the hardware component information from the printer in response to determining that the acquired printer model name has already been stored in the storage device, and that the optional hardware component cannot be mounted to the printer;

acquiring, from the printer, the hardware component information for the acquired printer model name without acquiring, from the printer, the function information corresponding to the acquired printer model name, in response to determining that the acquired printer model name has already been stored in the storage device, and that the optional hardware component can be mounted to the printer;

acquiring, from the printer, both the function information and the hardware component information corresponding to the acquired printer model name when the acquired printer model name has been determined to not already be stored in the storage device; and generating an operation screen using one of the acquired function information stored in the storage device and the acquired function information acquired from the printer.

10. The print control apparatus of claim 1, wherein the function information is acquired through the storage device from the printer when the acquired printer model name has not been stored in the storage device.

* * * * *